US011926155B2

(12) United States Patent
Seike et al.

(10) Patent No.: US 11,926,155 B2
(45) Date of Patent: Mar. 12, 2024

(54) INKJET RECORDING DEVICE, METHOD FOR ADJUSTING INKJET RECORDING DEVICE, AND METHOD FOR CONTROLLING INKJET RECORDING DEVICE

(71) Applicant: Konica Minolta, Inc., Tokyo (JP)

(72) Inventors: Rieko Seike, Hino (JP); Takakazu Kuki, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 75 days.

(21) Appl. No.: 17/605,721

(22) PCT Filed: Apr. 26, 2019

(86) PCT No.: PCT/JP2019/017993
§ 371 (c)(1),
(2) Date: Oct. 22, 2021

(87) PCT Pub. No.: WO2020/217471
PCT Pub. Date: Oct. 29, 2020

(65) Prior Publication Data

US 2022/0250380 A1 Aug. 11, 2022

(51) Int. Cl.
*B41J 29/38* (2006.01)
*B41J 2/045* (2006.01)

(52) U.S. Cl.
CPC ......... *B41J 2/04563* (2013.01); *B41J 2/0458* (2013.01); *B41J 2/04581* (2013.01)

(58) Field of Classification Search
CPC . B41J 2/04563; B41J 2/04565; B41J 2/04541
See application file for complete search history.

(56) References Cited

FOREIGN PATENT DOCUMENTS

| | | | |
|---|---|---|---|
| CN | 108569031 | A | 9/2018 |
| JP | 2000-079680 | A | 3/2000 |
| JP | 2003-305843 | A | 10/2003 |
| JP | 2004306395 | A | 11/2004 |

(Continued)

OTHER PUBLICATIONS

PCT, International Search Report for the corresponding application No. PCT/JP2019/017993, dated Jul. 16, 2019, with English translation.

(Continued)

*Primary Examiner* — Lam S Nguyen
(74) *Attorney, Agent, or Firm* — LUCAS & MERCANTI, LLP

(57) ABSTRACT

An inkjet recording device includes an inkjet discharge head including a nozzle through which ink is discharged, a pressure chamber that communicates to the nozzle, and a pressure generator that generates a pressure change in ink in the pressure chamber according to application of a drive signal to cause ink to be discharged from the nozzle; a driver that is disposed outside the ink discharge head and that is provided with a drive circuit that outputs the drive signal; and a wire that electrically connects the driver with the ink discharge head and through which the drive signal output from the drive circuit and applied to the pressure generator. The driver includes a resistance element provided in a transmission path of the drive signal between the drive circuit and the wire. A magnitude of a resistance value of the resistance element corresponds to a length of the wire.

12 Claims, 8 Drawing Sheets

(56) References Cited

FOREIGN PATENT DOCUMENTS

| | | | |
|---|---|---|---|
| JP | 2006168095 | A | 6/2006 |
| JP | 2017503689 | A | 2/2017 |
| JP | 2017-061131 | A | 3/2017 |
| JP | 2018-176588 | A | 11/2018 |

OTHER PUBLICATIONS

JPO, Notice of Reasons for Refusal issued for related Japanese Patent Application No. 2021-515702, dated Feb. 7, 2023, and English translation thereof (12 pages).

Office Action dated Aug. 18, 2022 for the corresponding Chinese application No. 201980095611.X, and English translation.

PCT, Written Opinion of ISA for the corresponding application No. PCT/JP2019/017993, dated Jul. 16, 2019, with English translation.

EPO, Extended European Search Report for the corresponding European application No. 19925596.9, dated Mar. 21, 2022.

Office Action dated Jun. 27, 2023 for related Japanese Patent Application No. 2021-515702, and English translation.

Office Action dated Oct. 23, 2023 for related European Patent Application No. 19 925 596.9.

FIG. 8
| INK DISCHARGE HEAD NO. | WIRING LENGTH L [mm] | RESISTANCE VALUE R [Ω] |
|---|---|---|
| 1 | 1000 | 1.0 |
| 2 | 700 | 0.75 |
| 3 | 500 | 0.75 |
| 4 | 500 | 0.75 |
| 5 | 500 | 0.75 |
| 6 | 700 | 0.75 |
| 7 | 1000 | 1.0 |
FIG. 9
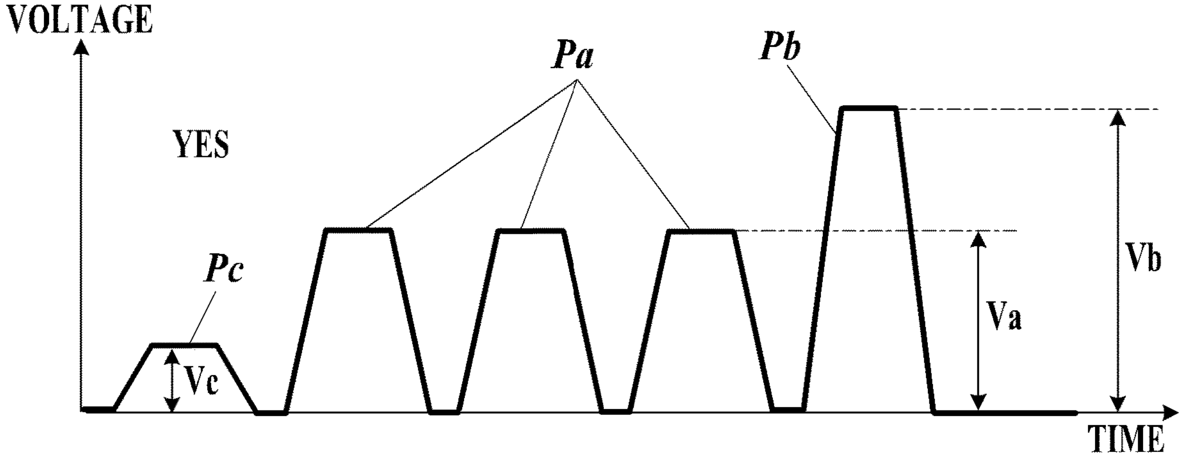
FIG. 10
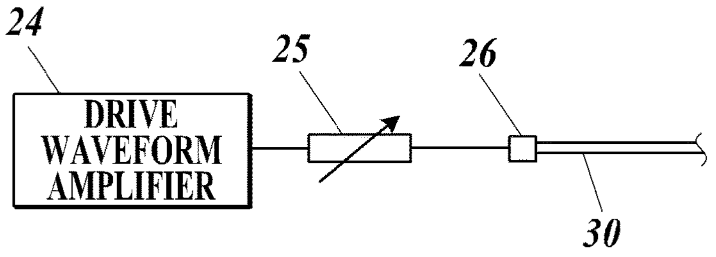

INKJET RECORDING DEVICE, METHOD FOR ADJUSTING INKJET RECORDING DEVICE, AND METHOD FOR CONTROLLING INKJET RECORDING DEVICE

CROSS REFERENCE TO RELATED APPLICATION

This Application is a 371 of PCT/JP2019/017993 filed on Apr. 26, 2019, the above application is incorporated herein by reference.

TECHNICAL FIELD

The present invention relates to an inkjet recording device, a method for adjusting an inkjet recording device, and a method for controlling an inkjet recording device

BACKGROUND ART

Conventionally, there have been inkjet recording devices in which ink is discharged from nozzles provided in an ink discharge head and landed at desired positions, thereby recording an image on a recording medium. The ink discharge head is provided with pressure chambers that communicate with nozzles and pressure generators that generate pressure change in ink in the pressure chambers according to application of drive signals. The pressure generators cause pressure change in ink in the pressure chambers, and ink is thereby discharged from the nozzles. A piezoelectric element is used as a pressure generator, and an amount and time of deformation of the pressure chamber is controlled by application of an appropriate voltage to the piezoelectric element. When an image is being recorded, a piezoelectric element(s) to apply a drive signal is selected from the piezoelectric elements respectively corresponding to the nozzles disposed in the inkjet discharge head according to a recorded image, and whether ink is discharged or not from each nozzle is thereby determined.

The piezoelectric elements have a capacitive load, and a drive load is varied according to the number of the piezoelectric elements which share the timing of application of the drive signal (that is, the number of nozzles from which ink is discharged at the same timing (hereinafter referred to as the number of discharge nozzles)). Therefore, an increase in the number of discharge nozzles causes the waveform of drive signal to be unstable, and the speed and volume of ink discharged from the nozzles may fluctuate from desired values, which may lead to a deterioration of the image quality.

Against such a problem, there is a technique to suppress deterioration of the image quality due to the fluctuation of the drive load by adjusting the waveform of the drive signal according to the number of discharge nozzles (ex. Patent Literature 1).

CITATION LIST

Patent Literature

Patent Document 1: JP 2017-061131 A

SUMMARY OF INVENTION

Technical Problem

However, in the case where the drive circuit that outputs drive signals is provided outside the ink discharge head, the transmission path of drive signals is long and the inductance of the transmission path causes the waveform of drive signal to be unstable. Therefore, it is impossible to suppress fluctuation of the speed and volume of ink discharged from the nozzles simply by adjusting the waveform of the drive signal according to the number of discharge nozzles, and it is impossible to effectively suppress deterioration of the image quality.

An object of the present invention is to provide an inkjet recording device, a method for adjusting an inkjet recording device, and a method for controlling an inkjet recording device that can suppress deterioration of the image quality effectively.

Solution to Problem

To achieve the above-mentioned object, one embodiment is the inkjet recording device including according to:

an inkjet discharge head including a nozzle through which ink is discharged, a pressure chamber that communicates to the nozzle, and a pressure generating means that generates a pressure change in ink in the pressure chamber according to application of a drive signal to cause ink to be discharged from the nozzle;

a driver that is disposed outside the ink discharge head and that is provided with a drive circuit that outputs the drive signal; and a wire that electrically connects the driver with the ink discharge head and through which the drive signal output from the drive circuit and applied to the pressure generating means, in which the driver includes a resistance element provided in a transmission path of the drive signal between the drive circuit and the wire, in which a magnitude of a resistance value of the resistance element corresponds to a length of the wire.

In one embodiment, the resistance element is provided in a state in which the resistance value is changeable.

In one embodiment, the inkjet recording device further includes:

a resistance value controlling means that changes the resistance value of the resistance element.

In one embodiment, the ink discharge head includes multiple nozzles, multiple pressure chambers corresponding to the multiple nozzles, and multiple pressure generating means corresponding to the nozzles, and the resistance value controlling means adjusts the resistance value of the resistance element at each time of application of the drive signal such that the resistance value of the resistance element corresponds to a number of nozzles through which ink is discharged at a same timing among the nozzles.

In one embodiment, the inkjet recording device further includes a temperature detector that detects a temperature corresponding to the temperature in the ink discharge head, and the resistance value controlling means adjusts the resistance value of the resistance element based on the temperature detected by the temperature detector.

In one embodiment, the ink discharge head includes multiple nozzles, pressure chambers corresponding to the multiple nozzles, and pressure generating means corresponding to the nozzles, and with C defined as a capacitance of a capacitance load of the multiple pressure generating means and with R as the resistance value of the resistance element, the resistance value of the resistance element is set in a range where a relationship of CR<500 ns is satisfied.

In one embodiment, the ink discharge head includes multiple nozzles, pressure chambers corresponding to the multiple nozzles, and pressure generating means corresponding to the nozzles, and the resistance value of the resistance element is set such that a change amount of a dropping speed of ink in response to a change in a number of nozzles through which ink is discharged at a same timing among the multiple nozzles satisfies a predetermined change amount suppressing condition.

In one embodiment, the inkjet recording device further includes:

multiple ink discharge heads;

multiple drivers corresponding to the multiple ink discharge heads; and multiple wires corresponding to the multiple drivers; and a magnitude of the resistance value of the resistance element included in each of the drivers corresponds to a length of the wire connected to the driver.

In one embodiment, the inkjet recording device further includes:

a drive controlling means that controls an output operation of the drive signal by the drive circuit, in which the ink discharge head includes multiple nozzles, pressure chambers corresponding to the multiple nozzles, and pressure generating means corresponding to the nozzles, the drive signal includes a pulse signal, and the drive controlling means adjusts a voltage amplitude of the pulse signal according to a number of nozzles through which ink is discharged at a same timing among the multiple nozzles.

In one embodiment, the drive controlling means adjusts a pulse width of the pulse signal according to the number of the nozzles through which ink is discharged at the same timing.

In one embodiment, the drive controlling means causes the drive circuit to output a sub pulse signal for shaking a liquid surface of ink in the nozzle and the drive signal including the pulse signal applied sequentially after the sub pulse signal.

In one embodiment, the drive controlling means adjusts a waveform of the drive signal such that at least one of a rise time and a fall time of the pulse signal is longer when the number of the nozzles through which ink is discharged at the same timing is smaller.

In one embodiment, the drive controlling means causes the drive circuit to output the drive signal including multiple pulse signals, and the pressure generating means causes multiple ink droplets that forms a pixel on a recording medium to be discharged from the nozzle according to the multiple pulse signals.

To achieve the above-mentioned object, one embodiment is the method for adjusting the inkjet recording device, the inkjet recording device including an inkjet discharge head including a nozzle through which ink is discharged, a pressure chamber that communicates to the nozzle, and a pressure generating means that generates a pressure change in ink in the pressure chamber according to application of a drive signal to cause ink to be discharged from the nozzle; a driver that is disposed outside the ink discharge head and that is provided with a drive circuit that outputs the drive signal; and a wire that electrically connects the driver with the ink discharge head and through which the drive signal output from the drive circuit and applied to the pressure generating means, in which the driver includes a resistance element provided in a transmission path of the drive signal between the drive circuit and the wire, in which a magnitude of a resistance value of the resistance element is set to a value corresponding to a length of the wire.

To achieve the above-mentioned object, one embodiment is the method for controlling the inkjet recording device, the inkjet recording device including an inkjet discharge head including a nozzle through which ink is discharged, a pressure chamber that communicates to the nozzle, and a pressure generating means that generates a pressure change in ink in the pressure chamber according to application of a drive signal to cause ink to be discharged from the nozzle; a driver that is disposed outside the ink discharge head and that is provided with a drive circuit that outputs the drive signal; and a wire that electrically connects the driver with the ink discharge head and through which the drive signal output from the drive circuit and applied to the pressure generating means, in which the driver includes a resistance element provided in a transmission path of the drive signal between the drive circuit and the wire, in which the ink discharge head includes multiple nozzles, multiple pressure chambers corresponding to the multiple nozzles, and multiple pressure generating means corresponding to the nozzles, in which at each time of application of the drive signal, a resistance value of the resistance element is adjusted such that a magnitude of the resistance value of the resistance element corresponds to a length of the wire and to a number of nozzles through which ink is discharged at a same timing among nozzles.

Advantageous Effects of Invention

According to the present invention, it is possible to effectively suppress deterioration of the image quality.

BRIEF DESCRIPTION OF DRAWINGS

FIG. 8 shows an example of setting of resistance values of resistance elements in multiple ink discharge heads.

FIG. 9 shows an example of drive signals including a sub pulse signal.

FIG. 10 shows a configuration of part of the inkjet discharge head according to Modification Example 1.

DESCRIPTION OF EMBODIMENTS

Hereinafter, embodiments of an inkjet recording device, a method for adjusting inkjet recording device, and a method for controlling inkjet recording device according to the present invention are described with reference to the drawings.

First Embodiment

Figure 1:
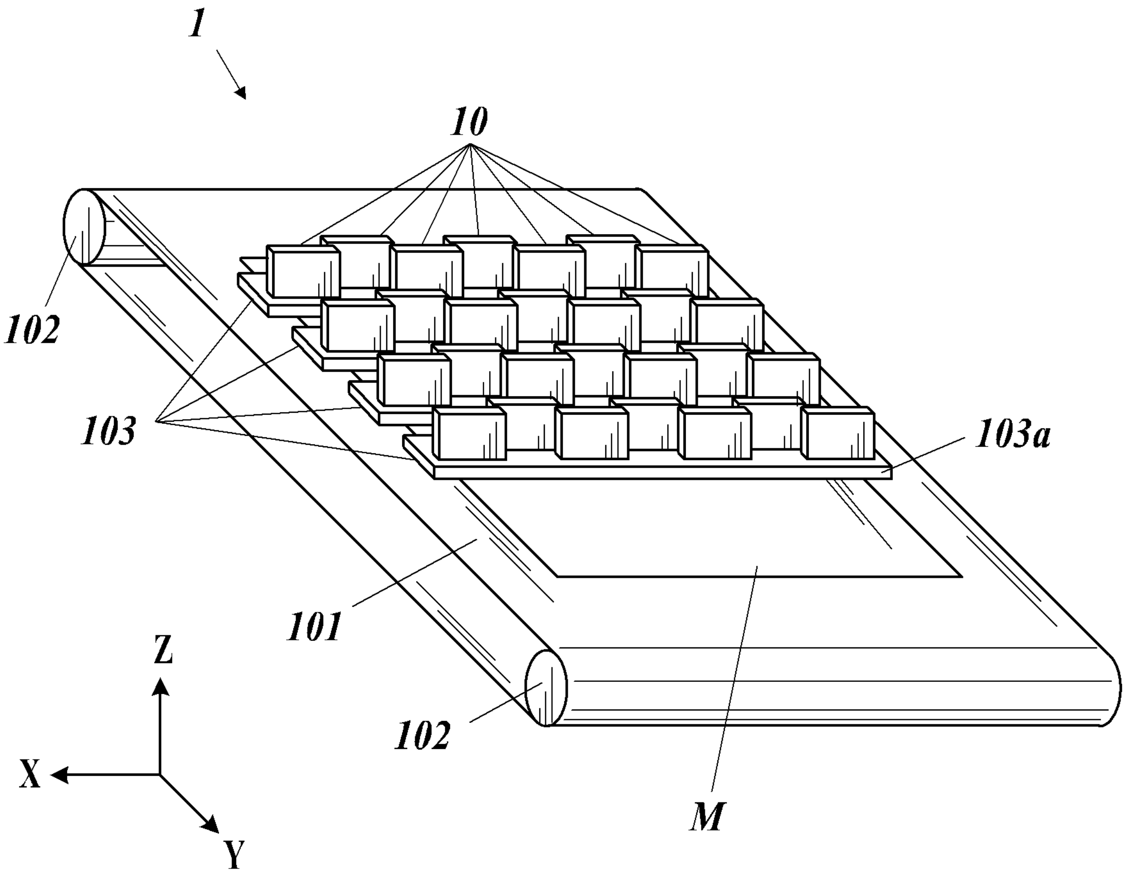
FIG. 1 shows a schematic configuration of an inkjet recording device.

FIG. 1 shows a schematic configuration of the inkjet recording device 1 in an embodiment of the present invention.

The inkjet recording device 1 includes a conveyance belt 101, conveying rollers 102, a head unit 103, and the like.

Each of the conveying roller 102 is rotated around a rotation axis parallel to the X direction in FIG. 1, driven by a conveyance motor not shown in the drawings. The conveyance belt 101, which is a ring-shaped belt supported by a pair of the conveying rollers 102 inside, rotationally moves around the pair of the conveying rollers 102 as the conveyance rollers 102 rotate. The inkjet recording device 1 conveys a recording medium M in the moving direction of the conveyance belt 101 (Y direction in FIG. 1) as the conveyance belt 101 rotationally moves at a speed corresponding to the rotation speed of the conveying roller 102 with the recording medium M being placed on the conveyance belt 101.

The head unit 103 records an image on the recording medium M by discharging ink from the nozzles N (see FIG. 2) onto the recording medium M conveyed by the conveyance belt 101 based on the image data. In the inkjet recording device 1 of the embodiment, four head units 103, which correspond respectively to four different color inks of yellow (Y), magenta (M), cyan (C) and black (K), are aligned at predetermined intervals in the order from the upstream in the conveyance direction of the recording medium M. The number of the head units 103 may be three or less or five or more, according to the number of colors used in the image recording.

Figure 2:
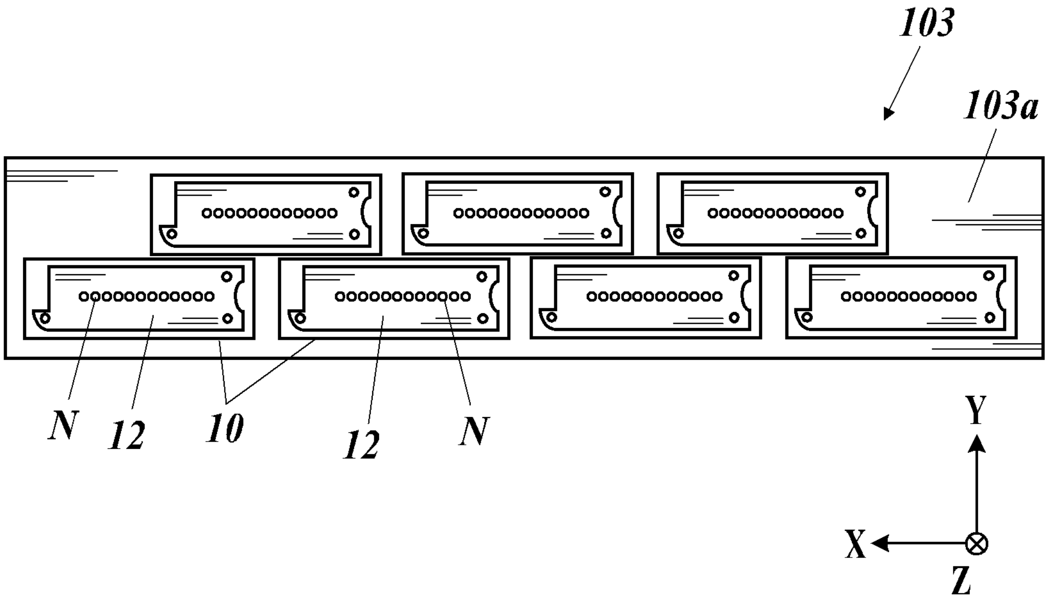
FIG. 2 is a schematic drawing showing a configuration of a head unit.

FIG. 2 shows a schematic configuration of the head unit 103, which is a plan view of the head unit 103 viewed from the side facing the conveyance face of the conveyance belt 101.

Each of the head units 103 includes a base 103*a* in a hotplate shape and multiple (seven in this embodiment) ink discharge heads 10 that are fixed to the base 103*a* by fitting openings that penetrate the base 103*a*.

Each of the ink discharge heads 10 includes a head chip 12 provided with multiple nozzles N from which ink is discharged, and the nozzle opening face of the head chip 12 is exposed from an opening of the base 103*a*. In the head chip 12, the nozzles N are one-dimensionally arranged in a direction intersecting the conveyance direction of the recording medium M (the width direction orthogonal to the conveyance direction, namely the X direction, in this embodiment) to form a nozzle row. In the head chip 12, there may be multiple nozzle rows in a positional relation such that the positions of the nozzles N are shifted from each other in the X direction.

The ink discharge heads 10 in each of the head units 103 are disposed in a staggered pattern such that the arrangement range of the nozzles N in the X direction corners the width in the X direction of the area of the recording medium M on the conveyance belt 101 where an image is recordable. As the ink discharge heads 10 are disposed as described above, the inkjet recording device 1 can record an image on the conveyed recording medium M by discharging ink from the ink discharge heads 10 at appropriate timings according to the image data with the head unit 103 being fixed. That is, the inkjet recording device 1 records images in a single pass method.

Figure 3:
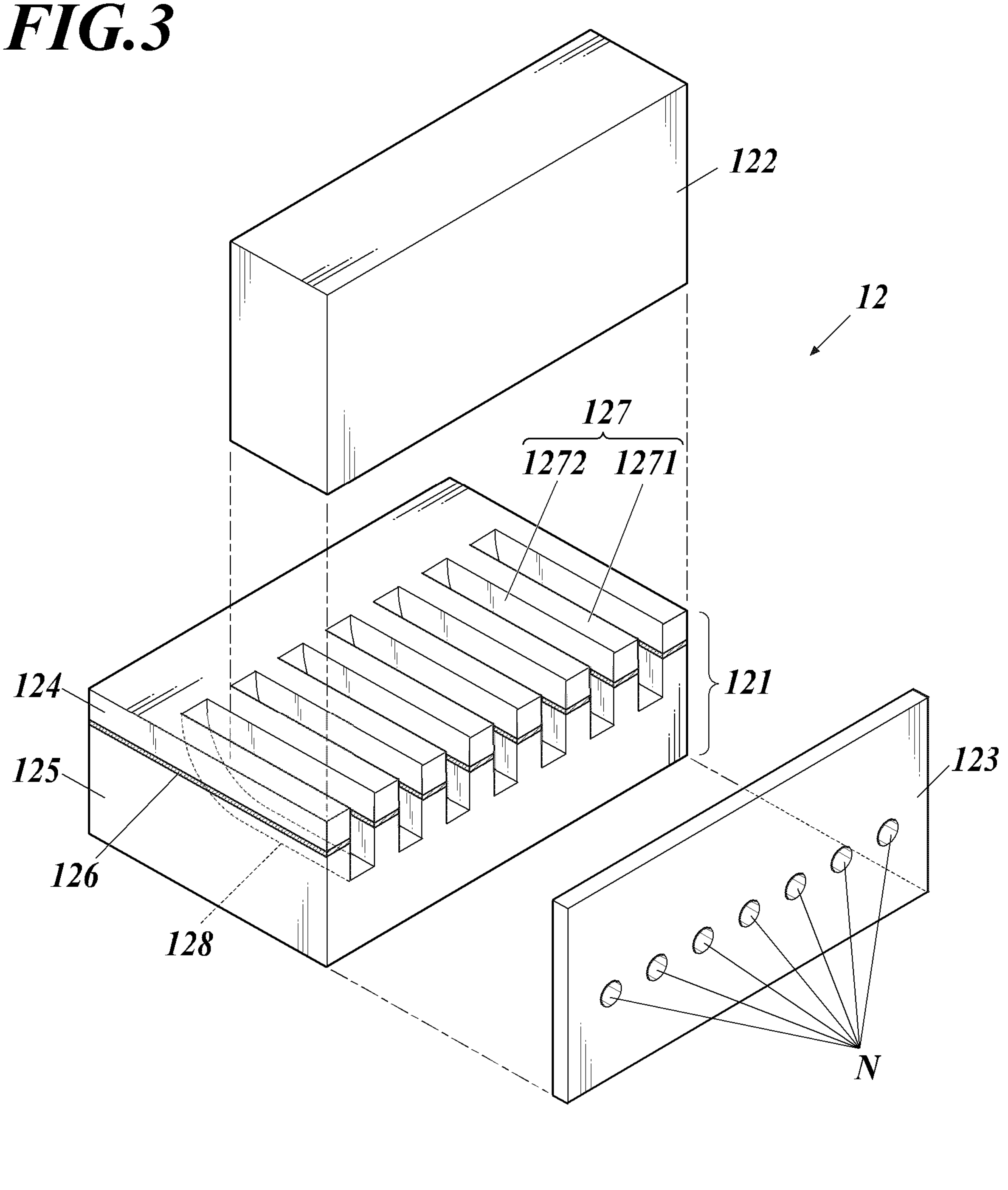
FIG. 3 is an exploded perspective view showing a configuration of a head chip.

FIG. 3 is an exploded perspective view showing a configuration of the head chip 12. In FIG. 3, the number of the nozzles N is simplified to seven, bin the head chip 12 in this embodiment includes several hundreds or thousands of the nozzles N.

The head chip 12 includes a channel substrate 121 on which multiple pressure chambers 128 (channels) respectively communicating to the nozzles N. A nozzle plate 123 with the multiple nozzles N is attached to the end face of the channel substrate 12L A cover plate 122 is attached to the upper part of the channel substrate 121 on the nozzle plate 123 side.

The channel substrate 121 has a structure in which two substrates 124 and 125 are attached to each other via an attachment portion 126. The base substrates 124 and 125 are made of a piezoelectric material such as lead zirconate titanate (PZT), and are polarized in opposite directions in the thickness direction. The pressure chambers 128 are formed at equal intervals on the channel substrate 121, and a partition wall 1271 is formed at each interval between the pressure chambers 128. An electrode 1272 is provided on a side wall of the pressure chamber 128 (the surface of the partition wall 1271), and the partition wall 1271 is bent (shear deformation) centered around the attachment portion 126 according to a voltage signal(s) (drive signal(s)) of a drive waveform applied to the electrode 1272 of the neighboring pressure chambers 128. The shear deformation of the partition wall 1271 according to the drive signal applied to the electrode 1272 changes the ink pressure in the pressure chamber 128, and ink in the pressure chamber 128 is discharged from the nozzle N accordingly. The partition wall 1271 with the electrode 1272 constitutes a piezoelectric element 127 (pressure generation means, actuator) that causes pressure change in ink in the pressure chamber 128.

As described above, the inkjet discharge head 10 in this embodiment is of a shear mode inkjet discharge head that discharges ink from the nozzles N by the shear stress generated by applying an electric field in a direction orthogonal to the polarization direction of the piezoelectric element.

Figure 4:
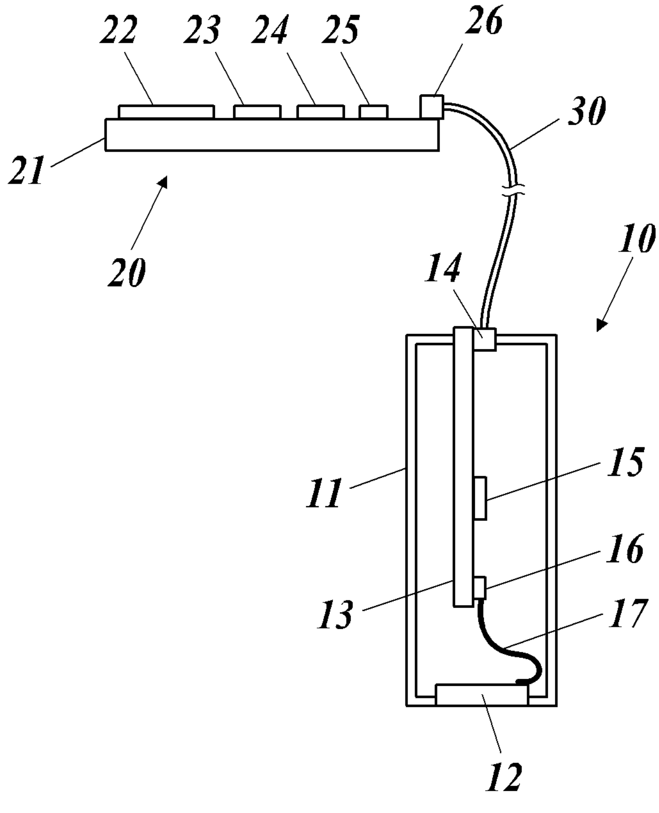
FIG. 4 shows a configuration for supplying drive signals to a head chip of an ink discharge head in the inkjet recording device.

FIG. 4 shows a configuration for supplying drive signals to the head chip 12 of the inkjet discharge head in the inkjet recording device 1.

The ink et recording device 1 includes the ink discharge head 10, a driver 20 that is disposed outside the ink discharge head 10, and a wiring cable 30 (wire) that electrically connects the driver 20 with the ink discharge head 10.

The driver 20 includes a drive substrate 21, a drive controller 22 (drive controlling means, resistance value controlling means), a DAC 23 (digital-analog convertor), and drive waveform amplifier circuit 24 (drive circuit), a resistance element 25, a first connector 26, and the like. The driver 20 outputs drive signals that drive the piezoelectric elements 127 in the ink discharge head 10 at appropriate timings according to the data of the image to be recorded.

The drive substrate 21 is a rigid substrate where metal routing wiring is formed on the surface of an insulating base material.

The drive controller 22, the DAC 23, and the drive waveform amplifier circuit 24, which are a group of circuit elements mounted on the drive substrate 21, generate the above-described drive signals and output them from the drive waveform amplifier circuit 24.

The resistance element 25 is a terminating resistance connected to an output unit (output terminal) of the drive signals in the drive waveform amplifier circuit 24. That is, the resistance element 25 is provided in the drive signal transmission path between the drive waveform amplifier circuit 24 and the wiring cable 30. The resistance element 25 may be formed as an independent circuit (ex., leaded package type, chip resistor type), but not limited to this. The resistance element 25 may be formed in an integrated circuit, for example.

The resistance value of the resistance element 25 corresponds to the length of the wiring cable 30. The method of determining the resistance value of the resistance element 25 is described later.

The first connector 26 electrically connects the routing wiring (the signal transmission path connected to the resistance element 25) of the drive substrate 21 with the wiring cable 30.

The wiring cable 30 is connected to the driver 20 via the first connector 26 and connected to the ink discharge head 10 via a second connector 14. The drive signals output from the drive waveform amplifier circuit 24 are transmitted via the wiring cable 30 and applied to the piezoelectric elements 127 of the head chip 12. The configuration of the wiring cable 30 is not particularly limited, but a linear conductor such as a copper covered by an insulating member may be used, for example.

The ink discharge head 10 includes a case 11, the head chip 12, a head substrate 13, the second connector 14, a discharge selection switching element 15, a third connector 16, an FPC 17 (flexible printed circuit), and the like.

The case 11 stores the components of the inkjet discharge head 10 inside and protects them. The head chip 12 is fixed to the case 11 with the nozzle opening face being exposed to the outside. The second connector 14 is provided with a terminal to connect to the wiring cable 30 being exposed outside.

The head substrate 13 is a rigid substrate in which metal routing wiring is formed on the surface of an insulating base material. The second connector 14, the discharge selection switching element 15, and the third connector 16 are mounted on the head substrate 13. The routing wiring of the head substrate 13 includes an input wire for inputting drive signals from the second connector 14 to the discharge selection switching element 15, and output wires corresponding to the piezoelectric elements 127 in number for outputting drive signals from the discharge selection switching element 15 to the piezoelectric elements 127 respectively corresponding to the nozzles N.

The second connector 14 electrically connects the wiring cable 30 with the input wires on the head substrate 13.

The discharge selection switching element 15 changes whether the drive signals input from the input wire on the head substrate 13 are applied to the piezoelectric elements 127 respectively corresponding to the nozzles N. That is, the discharge selection switching element 15 causes the drive signal not to be applied to the piezoelectric element(s) 127 corresponding to the nozzle(s) from which ink is not to be discharged based on the data of the image to be recorded, thereby switching ink discharge from each nozzle N.

The third connector 16 electrically connects the output wires on the head substrate 13 with the connection wires on the FPC 17.

The FPC 17 is provided with connection wires corresponding to the pressure elements 127, and is pressure-bonded to the head chip 12 so that each connection wire can be electrically connected to the routing wiring from the piezoelectric elements 127 in the head chip 12. The drive signals output from discharge selection switching element 15 to the piezoelectric elements 127 are applied to the corresponding piezoelectric elements 127 via the output wires on the head substrate 13, the connection wire on the ITC 17, and the routing wiring inside the head chip 12.

Figure 5:
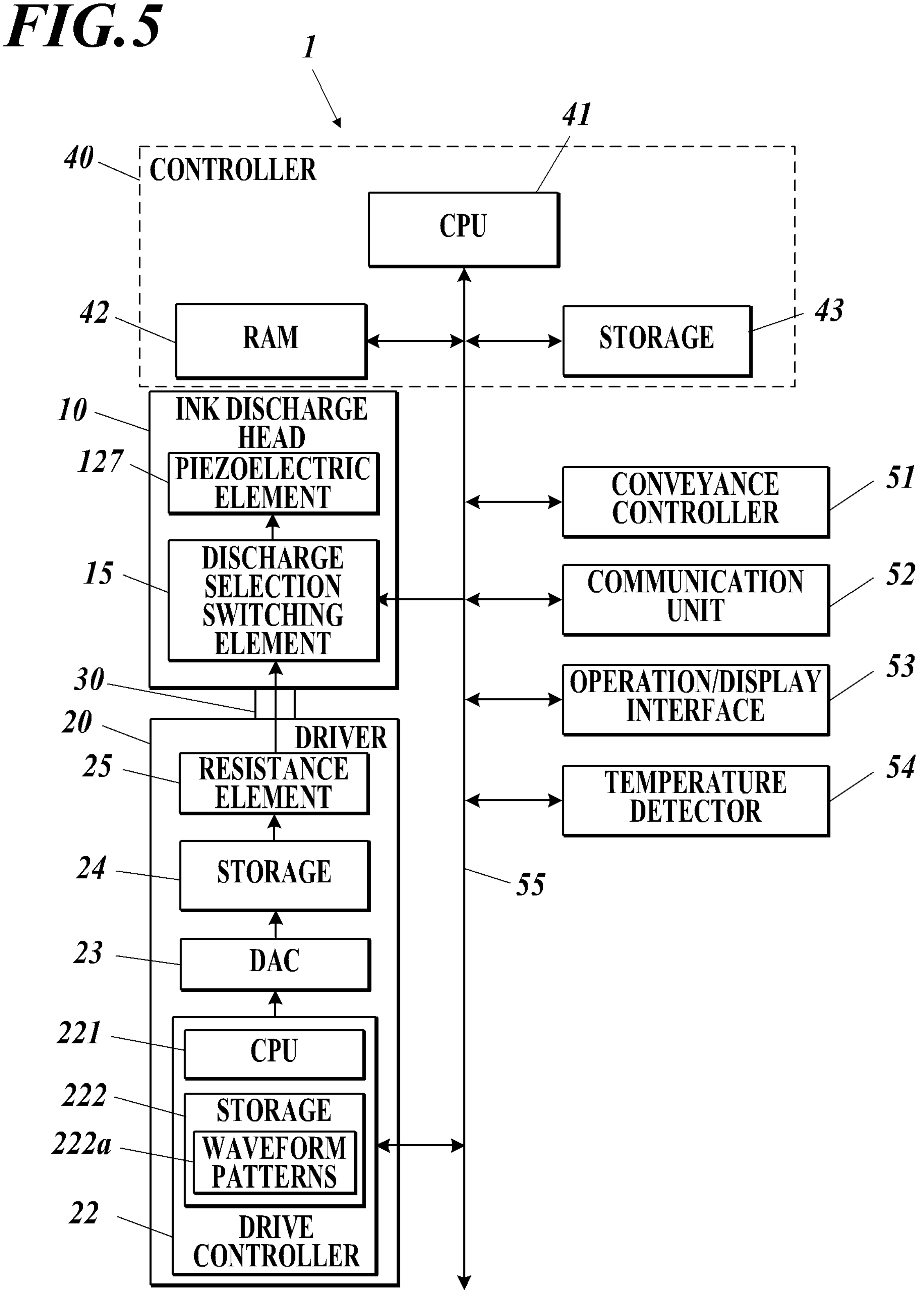
FIG. 5 is a block diagram showing a functional configuration of the inkjet recording device.

FIG. 5 is a block diagram showing a functional configuration of the inkjet recording device 1.

The inkjet recording device 1 includes a controller 40, a conveyance controller 51, a communication unit 52, an operation/display interface 53, a temperature detector 54, and the ink discharge head 10, the driver 20, the wiring cable 30 described above, and the like, and these components are connected via a bus 55 so as to transmit and receive signals.

The controller 40 centrally controls the overall operation of the inkjet recording device 1. The controller 40 includes a CPU 41 (central processing unit), a RAM 42 (random access memory), a storage 43, and the like.

The CPU 41 reads out control programs stored in the storage 43 and performs various kinds of control processing concerning the image recording, its setting, and the like.

The RAM 42 provides a working memory space for the CPU 41 and stores temporal data. The storage 43 includes a non-volatile memory that stores the control programs, setting data, and the like. The storage 43 may include a DRAM that temporarily stores setting concerning image recording commands (print jobs) externally obtained via the communication unit 52, image data of images to be recorded, and the like.

The drive controller 51 causes a motor to rotate the conveying roller 102 to rotate the conveying roller 102 at an appropriate speed and timing. The conveyance controller 51 may be configured in the same way as the controller 40.

The communication unit 52 transmits and receives data to and from an external device(s) by a predetermined communication standard. The communication unit. 52 includes a connection terminal concerning the communication standard used, a hardware (network card), and the like of a driver concerning and communication connection.

The operation/display interface 53 displays status information, a menu, and the like related to image recording, and receives operation input by a user. The operation/display interface 53 includes, for example, a display screen of a liquid crystal panel, a driver for the liquid crystal panel, a touch panel piled on the liquid crystal screen, and the like, and outputs an operation detection signal corresponding to a position of touch operation by a user and a kind of operation to the controller 40.

The temperature detector 54, which is attached to the ink discharge head 10 or disposed near the ink discharge head 10, detects the temperature corresponding to the temperature of the ink discharge head 10 and outputs the detection result to the controller 40.

The drive controller 22 of the driver 20 controls the operations of the components of the driver 20 according to the content of the image data of the images to be recorded. The drive controller 22 includes a CPU 221, a storage 222, and the like. The storage 222 retains waveform patterns 222*a* of drive signals for discharging ink from the nozzles N as digital discrete value array data. The CPU 221 selects waveform pattern data (digital waveform data) corresponding to a waveform pattern for applying a drive voltage of an appropriate waveform pattern to the piezoelectric element 127 according to whether ink is discharged from each nozzle N based on the image data of the image to be recorded stored in the storage 222 or the storage 43 and outputs the data to the DAC 23 at an appropriate timing according to a clock signal not shown in the drawings.

The DAC 23 converts the waveform pattern data of the drive waveform input from the drive controller 22 into analog, and outputs the obtained analog signal (drive signal) to the drive waveform amplifier circuit 24.

The drive waveform amplifier circuit 24 amplifies the drive signal input from the DAC 23 (voltage amplification, and then current amplification) and outputs the amplified drive signal. The drive signal output from the drive waveform amplifier circuit 24 is transmitted to the ink discharge head 10 via the transmission path with the resistance element 25 and the wiring cable 30.

Next, a method for driving the ink discharge head 10 and a method for determining the resistance value of the resistance element 25 in the inkjet recording device 1 are described.

In the inkjet recording device 1 in this embodiment, multiple ink droplets sequentially discharged from the nozzle are joined and landed on a recording medium M, thereby forming a pixel of the recorded image. The density (gradation) of the pixel can be adjusted by changing the number of droplets to be joined. The multiple ink droplets before being joined may be connected by a columnar ink (ink liquid column), or may be separate from each other.

Figure 6:
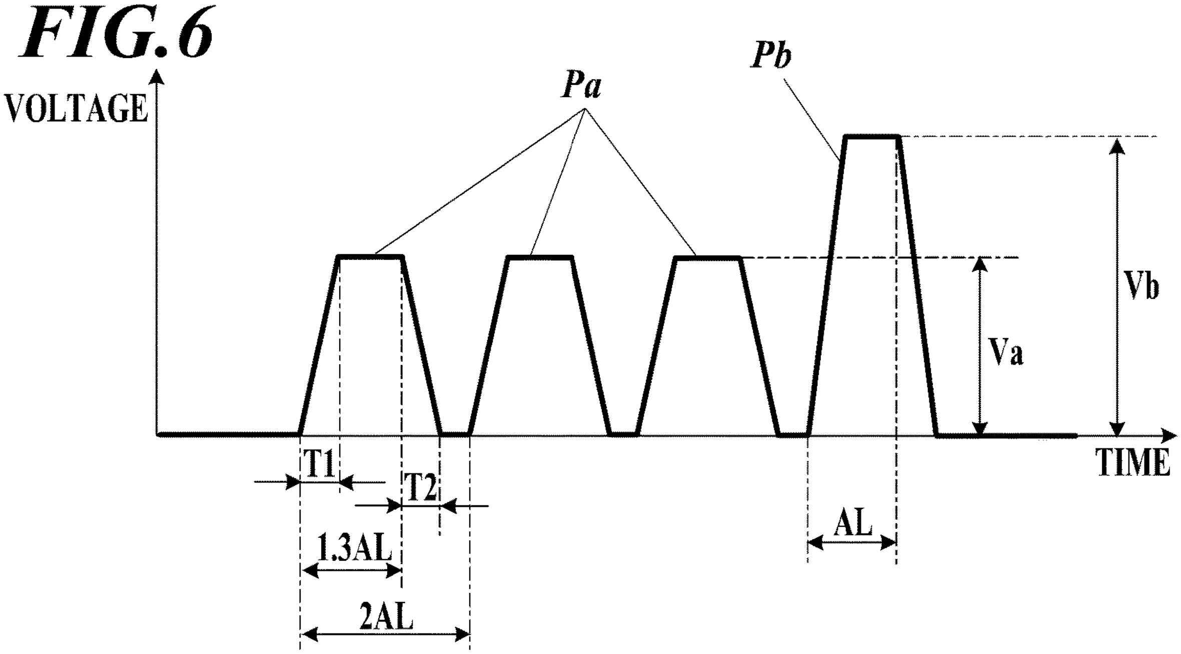
FIG. 6 shows an example of a drive signal.

FIG. 6 shows an example of a drive signal used m this embodiment.

The drive signal in FIG. 6 includes three first pulse signals Pa, and a second pulse signal Pb applied after the first pulse signals. Hereinafter, any one of the first pulse signals Pa and the second pulse signal Pb is referred to as a "pulse signal P."

The pulse signal P is a voltage signal of a trapezoidal wave. As a raised part of the trapezoidal wave of the pulse signal P is applied to the piezoelectric element 127, the piezoelectric element 127 (the partition wall 1271) is shear-deformed in a direction of the pressure chamber 128 expanding (the direction of increase in the volume), and as a lowered part of the trapezoidal wave is applied to the piezoelectric element 127 (the partition wall 1271) is shear-deformed in a direction of the pressure chamber 128 shrinking (the direction of reduction in the volume). As described above, as the pressure chamber 128 expands and then shrinks, the ink pressure inside the pressure chamber 128 increases and an ink droplet is discharged from the nozzle N. That is, as each pulse signal P is applied, an ink droplet is discharged from the nozzle N. Therefore, four ink droplets to form one pixel are sequentially discharged from the nozzle N according to the drive signal in FIG. 6 including the four pulse signals P.

The voltage amplitude of the first pulse signal Pa is Va, and the time from the trapezoidal wave starts to rise until it starts to fall (pulse width) is 1.3 AL. The AL (acoustic length) is ½ of the acoustic resonance period of the pressure wave in the pressure chamber 128, and is approximately 3.5 μs in this embodiment. A rise time T1 and a fall time T2 of the trapezoidal wave of the first pulse signal Pa are 1 μs. The three first pike signals Pa are applied with a pulse period of 2 AL.

The voltage amplitude of the second pulse signal Pb is Vb, and be pulse width is AL.

The voltage amplitude VU of the first pulse signal Pa is adjusted to a smaller value than the voltage amplitude Vb of the second pulse signal Pb. This is for suppressing a difference in the ink speed when the numbers of ink droplets sequentially discharged from different nozzles N are different from each other. That is, while the ink speed when two or more ink droplets by the first pulse signals Pa added to the second pulse signal Pb are sequentially discharged and joined together tends to be higher than the ink speed of a single ink droplet by the second pulse signal Pb only, the voltage amplitude Va. of the first pulse signal Pa, is smaller than the voltage amplitude Vb and the dropping speed of ink discharged by the first pulse signal Pa is decreased. It is thereby possible to suppress the dropping speed of ink when two or more ink droplets are sequentially discharged and reduce the difference in speed described above.

As described above, the drive signal applied to each piezoelectric element 127 is adjusted so that ink droplets are discharged from the nozzle N at a desired speed and in a desired volume (ink amount).

However, the waveform of the drive signal is distorted by the capacitance of the piezoelectric element 127, the inductance and resistance of the transmission path of the drive signal, and the like. When the waveform of the drive signal is distorted, the dropping speed and volume of ink discharged from the nozzle N deviate from the desired values, and the landing position on the recording medium M and the landing liquid amount are fluctuated, leading to deterioration of the image quality.

In particular, in the inkjet recording device 1 in this embodiment, as the drive waveform amplifier circuit 24 that outputs drive signals is provided outside the ink discharge head 10, the transmission path of drive signals (mainly the wiring cable 30) is longer and the inductance and resistance are increased. Therefore, it is impossible to disregard the fluctuation of the ink dropping speed and volume due to the inductance and resistance of the transmission path of drive signal, or the wiring cable 30 in particular. Specifically, an increase lathe inductance of the wiring cable 30 causes overshoot and undershoot in the drive signal, leading to larger distortion from the desired waveform. The dropping speed and volume of ink thereby deviate from the desired values. The ink speed among those is usually decreased by a distortion of the waveform, but may be higher than the desired value depending on the distortion of the waveform. The inductance of the wiring cable 30 may change the change amount of the dropping speed of ink when he number of the piezoelectric elements 127 which share the period of application of the drive signal, that is, the number of the nozzles N through which ink is discharged at the same timing (number of discharge nozzles), is changed. As the change amount of the dropping speed of ink with respect to the number of discharge nozzles is larger, the deterioration of the image quality of recorded images is significant.

Thus, in this embodiment, with the resistance element 25 provided in the output unit of the drive waveform amplifier circuit 24, occurrence of overshoot and undershoot due to the inductance of the wiring cable 30 is suppressed and also distortion of the waveform of the drive signal is suppressed. The resistance value R of the resistance element 25 is set to a magnitude corresponding to the length of the wiring cable 30. Hereinafter, the method for setting the resistance value R of the resistance element 25 is described.

The resistance value R of the resistance element 25 is set so that the change amount (range) of the dropping speed of ink when the number of discharge nozzles is changed satisfies a predetermined condition of suppressing the change amount. Here, the condition of suppressing the change amount can be that the change amount of the dropping speed of ink when the number of discharge nozzles is changed is the smallest.

Figure 7A:
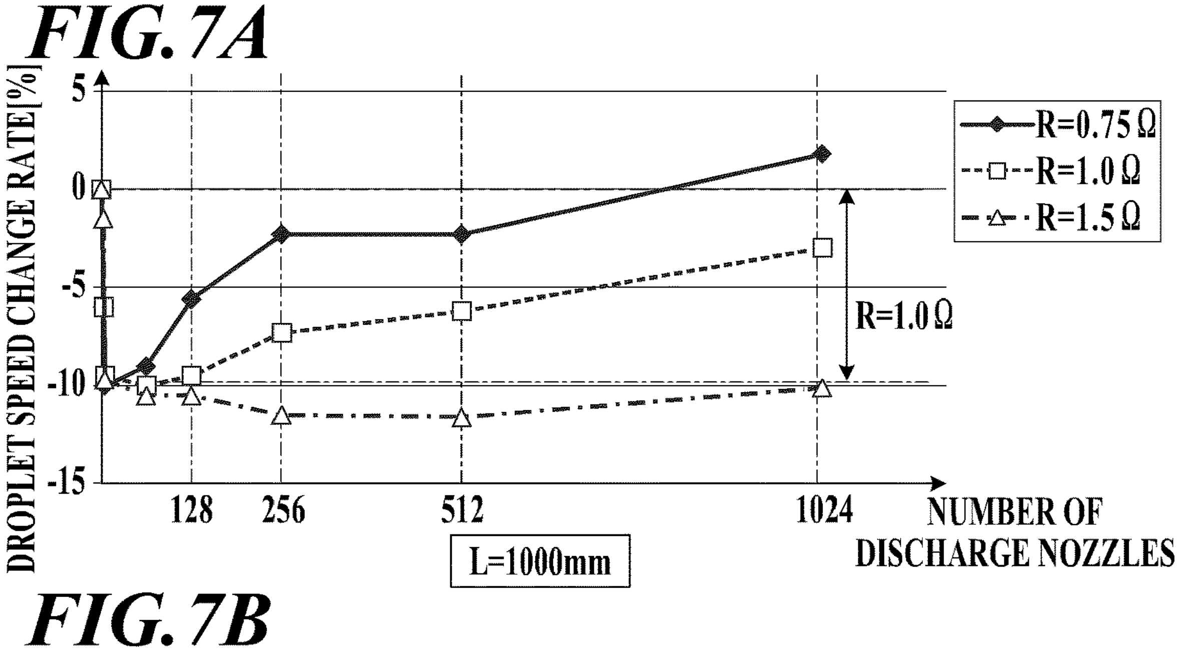
FIG. 7A shows an ink dropping speed change rate with respect to the number of discharge nozzles when a resistance value R is changed.
Figure 7B:
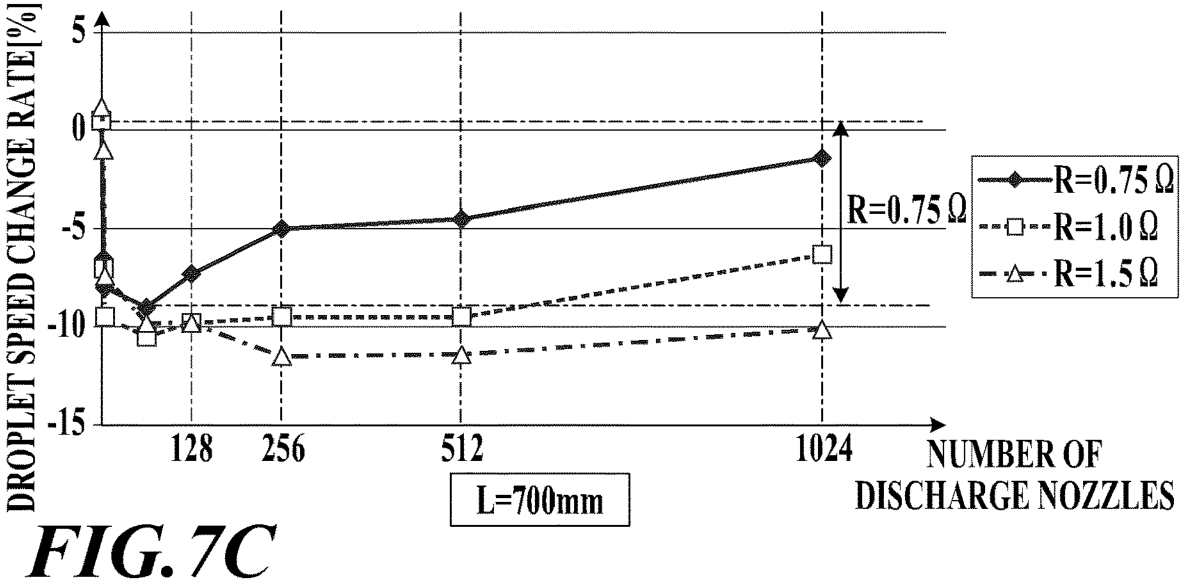
FIG. 7B shows an ink dropping speed change rate with respect to the number of discharge nozzles when a resistance value R is changed.
Figure 7C:
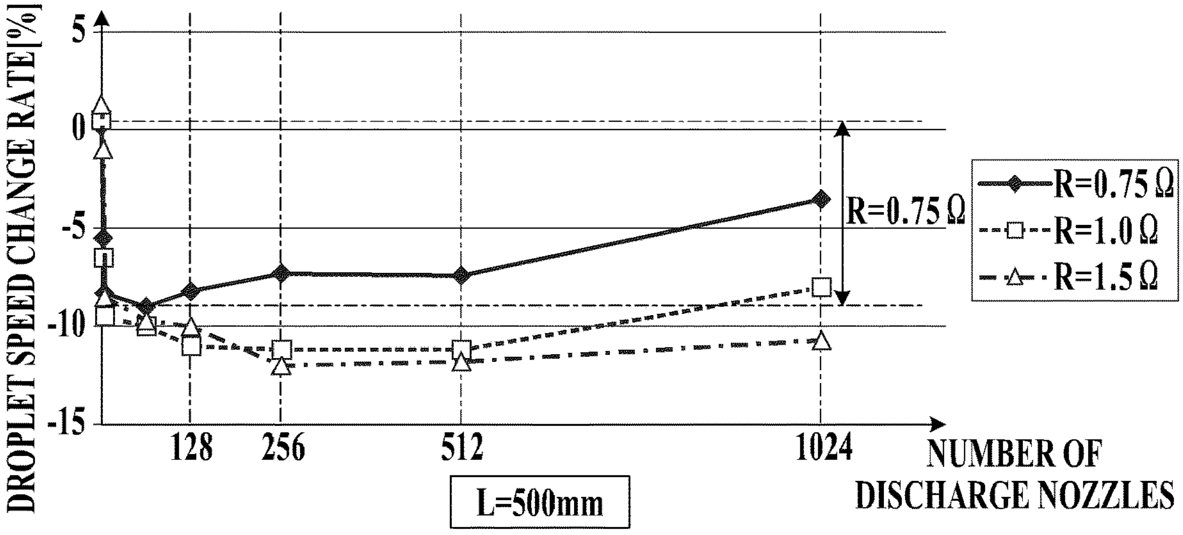
FIG. 7C shows an ink dropping speed change rate with respect to the number of discharge nozzles when a resistance value R is changed.

FIGS. 7A to 7C shows an ink dropping speed change rate with respect to the number of discharge nozzles when the resistance value R is changed.

Specifically, the graphs show the ink dropping rate change rates plotted thereon for the resistance values R 0.75Ω, 1.0Ω, and 1.5Ω of the resistance element 25 when ink is discharged from the nozzles N each using the same drive signals and the number of discharge nozzles is changed stepwise to 1024. The reference value of the ink dropping speed change rate may be, for example, an ink dropping speed when ink is discharged from a single nozzle N by a drive signal not distorted.

The options of the resistance value R is preferably selected in a range which satisfies the relationship CR<500 μs, where the capacitance of the capacitive load of the multiple piezoelectric elements 127 of the ink discharge head 10 is defined as C.

FIG. 7A shows an ink dropping speed change rate when the length of the wiring cable 30 (hereinafter, referred to as a "wiring length L") is 1000 mm. In the graph of FIG. 7A, the range of the ink dropping speed change rate (the change amount of the dropping speed) is the smallest when the resistance value R of the resistance element 25 is 1.0Ω. Thus, when the wiring length L is 1000 nan, the resistance value R is set to 1.0Ω.

FIG. 7B shows an ink dropping speed change rate when the wiring length L of the wiring cable 30 is 700 min. in the graph of FIG. 7B, the range of the ink dropping speed change rate is the smallest when the resistance value R of the resistance element 25 is 0.75Ω. Thus, when the wiring length L is 700 mm the resistance value R is set to 0.75Ω.

FIG. 7C shows an ink dropping speed change rate when the wiring length L of the wiring cable 30 is 500 mm. In the graph of FIG. 7C, the range of the ink dropping speed change rate is the smallest when the resistance value R of the resistance element 25 is 0.75Ω. Thus, when the wiring length L is 500 mm, the resistance value R is set to 0.75Ω.

FIG. 8 shows an setting example of the resistance values R of the resistance elements 25 in the multiple ink discharge heads 10.

In FIG. 8, the wiring lengths L of the wiring cables 30 connected to the ink discharge heads 10 of No. 1 to No. 7 and the resistance values R of the resistance elements 25 set according to the wiring lengths L. In the example of FIG. 8, the wiring length L of the wiring cables 30 connected to the inkjet discharge heads 10 of No. 1 and No. 7 are 1000 mm, and the resistance value R of the ink discharge heads 10 of No. 1 and No. 7 is set to 1.0Ω corresponding to that cable length L. The wiring length L of the wiring cables 30 connected to the ink discharge heads 10 of No. 2 and No. 6 is 700 mm, and the wiring length L of the wiring cables 30 connected to the ink discharge heads 10 of No. 3 to No. 5 is 500 min. The resistance value R of the ink discharge heads 10 of No. 2 to No. 6 is set to 0.75 n corresponding to those cable lengths L.

FIG. 8 is an example of the setting of the resistance values R corresponding to the wiring lengths L of the wiring cables 30, and the present invention is not limited to this example. For example, the resistance values R of the resistance elements 25 in all the ink discharge heads 10 may be different from each other or may be the same depending on the wiring lengths L of the wiring cables 30 connected to the ink discharge heads 10.

The method for setting the resistance value R of the resistance element 25 is not limited to those shown in FIGS. 7A to 7C, and the resistance value R may be set so that the range of the ink dropping speed change rate in the most frequent range of the number of discharge nozzles in the image recording (ex, the range of the number of discharge nozzles in FIGS. 7A to 7C, 128 to 1024) is the smallest. That is, the above-described condition of suppressing the change amount may be that the change amount of the dropping speed of ink in a predetermined number of discharge nozzles is the smallest. For example, in the examples of FIGS. 7A to 7C, in a case where the resistance value R is set so that the range of the dropping speed change rate for the number of discharge nozzles of 128 to 1024 is the smallest, the resistance value R is persistently set to 1.5Ω for the wiring lengths L of 1000 mm, 700 mm, and 500 mm.

In this embodiment, the resistance value R of the resistance element 25 is set as shown above, and in addition, the drive signal is adjusted (corrected) according to the number of discharge nozzles. When the number of discharge nozzles is varied, the number of the piezoelectric elements 127 which apply drive signals, that is, the drive load of the capacitance, is increased or decreased, and thus the distortion of the drive signal (e.x., the way the waveform rises or falls gets slow) is changed and the dropping speed and volume of discharged ink. On contrary, by adjusting the drive signal according to the number of discharge nozzles, it is possible to suppress change in the distortion of the drive signal and stabilize the dropping speed and volume of ink regardless of the number of discharge nozzles.

Specifically, the voltage amplitude of the pulse signal of the drive waveform is adjusted according to the number of discharge nozzles. The dropping speed of discharged ink can be increased by increasing the voltage amplitude of the pulse signal.

The pulse width of the pulse signal of the drive waveform described above may be adjusted according to the number of discharge nozzles.

As shown in FIG. 9, a sub pulse signal Pc for shaking the ink liquid surface in the nozzles N may be added for adjustment before the first pulse signals Pa and the second pulse signal Pb. The sub pulse signal Pc has a voltage amplitude Vc smaller than the voltage amplitude Va of the first pulse signal Pa. The dropping speed and volume of ink may be adjusted according to the relationship between the phase of the shaking of the liquid surface according to the sub pulse signal Pc and the phase of the pressure change by the pulse signal P. The voltage amplitude and pulse width of the sub pulse signal Pc may be further adjusted according to the number of discharge nozzles.

The adjusted rise time T1 of the pulse signal P may be longer as the number of discharge nozzles is smaller, and the adjusted fall time T2 of the pulse signal P may be longer as the number of discharge nozzles is smaller. The adjusted rise time T1 and fail time T2 may be longer as the number of discharge nozzles is smaller. The adjustment range of the rise time T1 and fall time T2 may be, for example, about 0 μs to 2 μs.

The drive signals are adjusted by the drive controller 22. That is, the drive controller 22 specifies the number of discharge nozzles of the ink discharge head 10 based on line data of the image data, input from the controller 40 and outputs the waveform pattern data adjusted according to the specified result to the DAC 23. Here, the adjusted waveform pattern data corresponding to the number of discharge nozzles is registered in advance in the waveform patterns 222*a* in the storage 222, and the waveform pattern data corresponding to the number of discharge nozzles can be selected and output to the DAC 23 by the drive controller 22. Otherwise, the voltage amplitude, the pulse width, the adjustment amount of the rise time T1 and the fall time T2, and the setting of presence/absence of the sub pulse signal Pc corresponding to the number of discharge nozzles are registered in the storage 222 or the storage 43, and the adjusted waveform may be generated each time based on the number of discharge nozzles and the settings described above by the drive controller 22.

Modification Example 1

Next, Modification Example 1 of the above-described embodiment is described. In the above-described embodiment, the example in which the resistance value P. of the resistance element 25 is fixed is described, but the resistance value R may be changeable.

FIG. 10 shows a configuration of part of the inkjet discharge head 10 according to Modification Example 1. In FIG. 10, a potentiometer is used as the resistance element 25. The configuration of the potentiometer is not particularly limited, but may be one that can adjust the resistance value R by changing the position of the connecting point according to the rotation of the adjustment axis. The potentiometer is not limited to one that can continuously adjust the resistance value R, and may be one that can change the resistance value IR stepwise.

Modification Example 2

Figure 11:
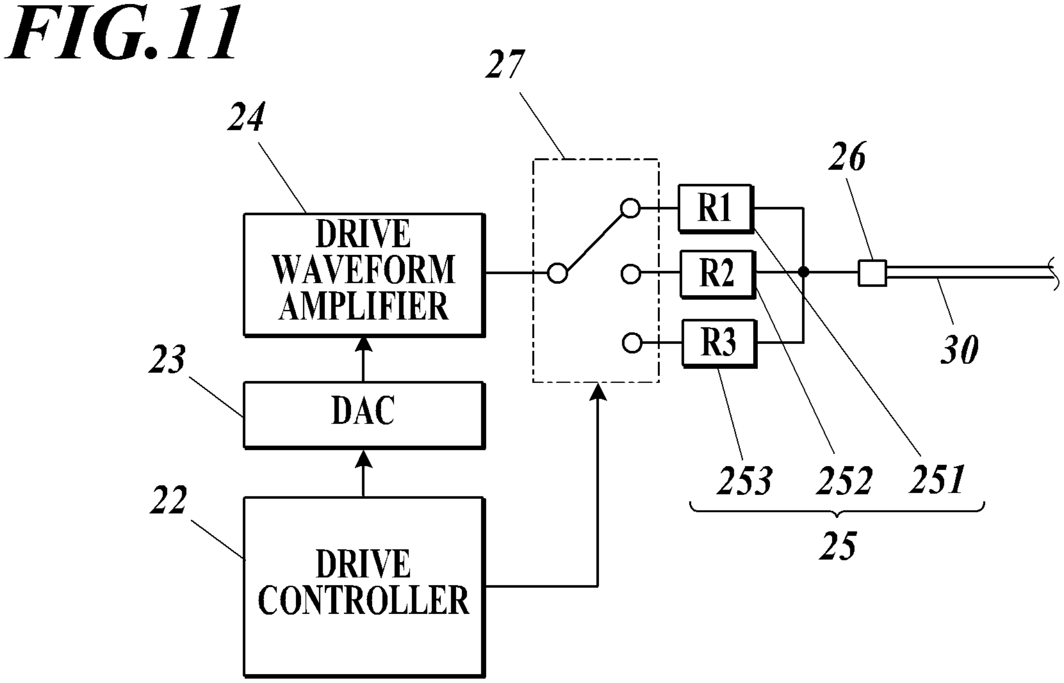
FIG. 11 shows a configuration of part of the ink discharge head according to Modification Example 2.

Next, Modification Example 2 of the above-described embodiment is described. This Modification Example is different from the above-described embodiment in that the drive controller 22 can change the resistance value R of the resistance value 25. Hereinafter, differences from the above-described embodiment are described, FIG. 11 shows a configuration of a part of the ink discharge head 10 according to Modification Example 2.

The resistance element 25 in this Modification Example includes the first resistance element 251 having the resistance value R1, the second resistance element 252 having the resistance value R2, and the third resistance element 253 having the resistance value 113, and those resistance elements are disposed in series and connected to the first connector 26. A switching element 27 that electrically connects the waveform amplifier circuit 24 with any one of the first resistance element 251, the second resistance element 252, and the third resistance element 253. The connection state by the switching element 27 is changeable under the control of the drive controller 22. That is, the drive controller 22 can change the resistance value R of the resistance element 25 among the three different resistance values R1, R2, and R3. The drive controller 22 of this Modification Example constitutes a resistance value controlling means.

The resistance value R of the resistance element 25 may be selected from two, four or more different values.

In this Modification Example, the drive controller 22 changes the resistance value R of the resistance element 25 for adjustment every time the drive signal is applied so that the resistance value R of the resistance element 25 corresponds to the number of discharge nozzles. That is, the drive controller 22 specifies the number of discharge nozzles of the ink discharge head 10 based online data of the image data input from the controller 40 and changes the resistance value IR of the resistance element 25 according to the specified result. For example, the resistance value R of the resistance element 25 corresponding to the number of discharge nozzles is registered in advance in the storage 222 or the storage 43, and the drive controller 22 switches the connection state of the switching element 27 so that the resistance value R corresponds to the number of discharge nozzles.

The drive controller 22 may adjust the resistance value R of the resistance value 25 according to the result of detection of the temperature by the temperature detector 54 in addition to the number of discharge nozzles. Since the capacitance of the piezoelectric element 127 and the resistance of the wiring cable 30 are varied according to the temperature, changes in those capacitance and resistance lead to distortion of the drive signal depending on the change amount of the temperature. Thus, it is possible to suppress distortion of the drive signal to stabilize the speed and volume of ink more effectively by adjusting the resistance value R according to the result of detection of the temperature. For example, as the temperature rises, the capacitance C of the piezoelectric element 127 increases. Thus, as the resistance R of the resistance 25 is reduced accordingly, it is possible to effectively suppress distortion of the drive signal.

Figure 12:
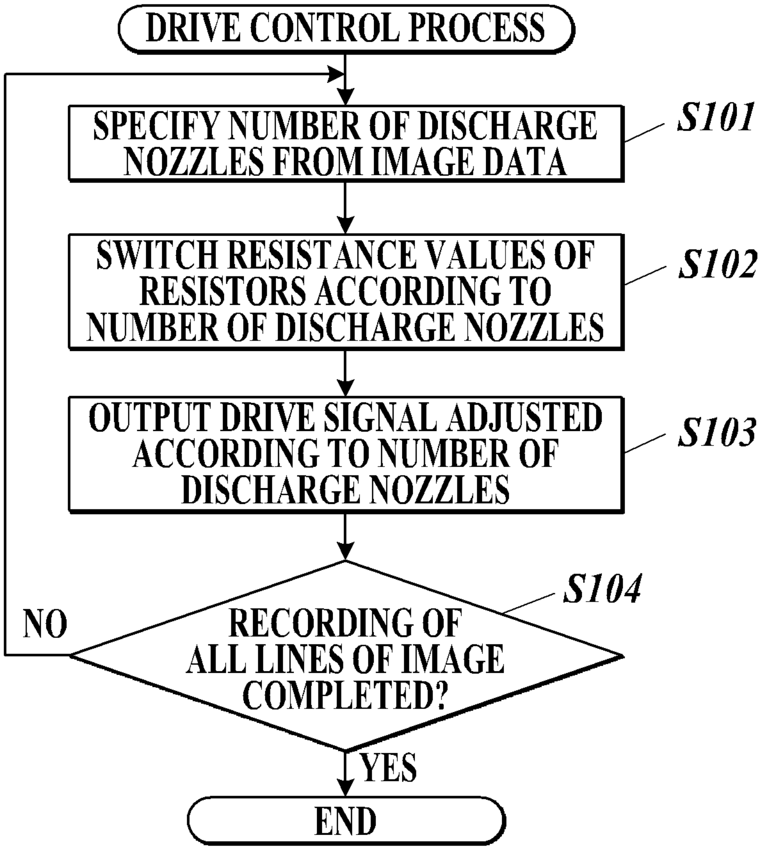
FIG. 12 is a flowchart of control steps of a drive control process according to Modification Example 2.

FIG. 12 is a flowchart showing control steps of the drive control process by the drive controller 22 according to Modification Example 2.

The drive control process is started with the start of the recording operation by the inkjet recording device 1.

At the start of the drive control process, the drive controller 22 specifies the number of nozzles used for recording lines to be recorded in the image based on the image data input from the controller 40 and the number of discharge nozzles (Step S101).

The drive controller 22 can switch the resistance value R of the resistance element 25 according to the specified number of discharge nozzles (Step S102). That is, the drive controller 22 outputs the control signal to the switching element 27 so that the resistance value R of the resistance element 25 corresponds to the specified number of discharge nozzles, and switches the resistance element to be connected to the drive waveform amplifier circuit 24 by the switching element 27.

The drive controller 22 outputs the drive signal adjusted according to the specified number of discharge nozzles from the drive waveform amplifier circuit 24 and causes ink to be discharged from each of the nozzles N (Step S103).

If the recording of all the lines of the image to be recorded is not completed ("NO" at Step S104), the drive controller 22 returns the process to Step S101, and if the recording of all the lines of the image to be recorded is completed ("YES" at Step S104), the drive controller 22 ends the drive control process.

As described hereinbefore, the inkjet recording device 1 in the embodiment of the present invention includes the ink discharge head 10 that includes the nozzles N through which ink is discharged, the pressure climbers 128 communicating to the nozzles N, the piezoelectric elements 127 generating pressure change in ink in the pressure chambers 128 to cause ink to be discharged from the nozzles N according to application of the drive signals, the driver 20 that is disposed outside the ink discharge head 10 and that includes the drive waveform amplifier circuit 24 as the drive circuit outputting the drive signals, and the wiring cable 30 that electrically connects the driver 20 with the ink discharge head 10 and through which the drive signals output from the drive waveform amplifier circuit 24 and applied to the piezoelectric elements 127 are transmitted. The driver 20 includes the resistance element 25 provided in the transmission path of the drive signals between the drive waveform amplifier circuit 24 and the wiring cable 30, and the magnitude of the resistance value R of the resistance element 25 corresponds to the wiring length L of the wiring cable 30.

In the configuration in which the drive waveform amplifier circuit 24 as this is disposed outside the ink discharge head 10, the drive signal is distorted by the inductance of the wiring cable 30 and the dropping speed and volume of ink deviate from the desired values. However, it is possible to appropriately suppress overshoot and undershoot of the drive signal due to the inductance of the wiring cable 30 to suppress distortion of the waveform of the drive signal by providing the resistance element 25 and setting the resistance value R of the resistance element 25 to a value corresponding to the wiring length L of the wring cable 30. This makes it possible to suppress variation in the dropping speed and volume of ink due to the inductance of the wiring cable 30. The change amount of the dropping speed of ink when changing the number of discharge nozzles is different according to a combination of the wiring length L of the wiring cable 30 and the resistance value R of the resistance element 25. Thus, it is possible to suppress the change amount of the dropping speed of ink with respect to the number of discharge nozzles by setting the resistance value R appropriately according to the wiring length of the wiring cable 30. As a result of these, it is possible to effectively suppress deterioration of the image quality.

The resistance element 25 in Modification Example 2 and Modification Example 3 is provided in a state where the resistance value R can be changed. This makes it possible to easily adjust the resistance value R in the case where the wiring length L of the wiring cable 30 is varied or in the case where the ink discharge head 10 is replaced.

The inkjet recording device 1 in Modification Example 2 includes the drive controller 22 as a resistance value controlling means that changes the resistance value R of the resistance element 25. This makes it possible to change the resistance value R of the resistance element 25 inside the inkjet recording device. The user can then change the resistance value R without replacing the resistance element 25 or directly adjusting the resistance value R, and the user convenience can be thereby improved.

In the inkjet recording device 1 in Modification Example 2, the ink discharge head 10 includes the nozzles N, the pressure chambers 128 corresponding to the pressure chambers 128, and the piezoelectric elements 127 corresponding to the nozzles N. The drive controller 22 adjusts the resistance value R of the resistance element 25 every time a drive signal is applied so that the magnitude of the resistance value R of the resistance element 25 corresponds to the number of discharge nozzles (the number of the nozzles N from which ink is discharged at the same tinting among all the nozzles N). This makes it possible to suppress variation of the dropping speed and volume of ink according to the number of discharge nozzles by also adjustment of the resistance value R of the resistance element 25. Thus, it is possible to more effectively suppress deterioration of the image quality.

The inkjet recording device 1 in Modification Example 2 includes the temperature detector 54 that detects the temperature corresponding to the temperature of the ink discharge head 10, and the drive controller 22 adjusts the resistance value R of the resistance element 25 based on the temperature detected by the temperature detector 54. This makes it possible to suppress distortion of the drive waveform caused by variation in the resistance value of the piezoelectric element 127 by the temperature and variation of the resistance of the wiring cable 30 or the like.

When the capacitance of the capacitive load of the piezoelectric elements 127 is defined as C and the resistance value of the resistance element 25 is defined as R, the resistance value R is set in a range where a relationship of CR<500 ns. It is thereby possible to suppress variation in the dropping speed and volume of ink due to slowing of a rise and fall of the waveform of the drive signal and suppress distortion o the drive signal caused by the inductance of the wiring cable 30 as well.

As the resistance value R of the resistance element 25 is set such that the change amount of the dropping speed of ink when changing the number of discharge nozzles satisfies the predetermined change amount suppressing condition, it is possible to keep the change amount of the dropping speed of ink with respect to the number of discharge nozzles small and effectively suppress deterioration of the image quality.

The inkjet recording device 1 includes the inkjet discharge heads 10, the drivers 20 corresponding to the ink discharge heads 10, and the wiring cables 30 corresponding to the ink discharge heads 10, and the magnitude of the resistance value R of the resistance element 25 of each of the drivers 20 corresponds to the wiring length L of the wiring cable 30 connected to the concerning driver 20. This makes it possible to effectively suppress deterioration of the image quality of each part of the image to be recorded by each of the ink discharge heads 10 in the configuration in which the ink discharge heads 10 and the drivers 20 are connected with each other using the wiring cables 30 of different wiring lengths L.

The inkjet recording device 1 includes the drive controller 22 as a drive controlling means that controls output operations of drive signals by the drive waveform amplifier circuit 24. The drive signals include a pulse signal P, and the drive controller 22 adjusts the voltage amplitude of the pulse signal according to the number of discharge nozzles. This makes it possible to suppress distortion of the drive signal (e.x., the way the waveform rises or falls gets slow) due to an increase and decrease in the drive load of the capacitance by a change in the number of the piezoelectric elements 127 which share the period of application of the drive signal. Thus, it is possible to stabilize the dripping speed and volume of discharged ink regardless of the number of discharge nozzles.

The drive controller 22 adjusts the pulse width of the pulse signal P according to the number of discharge nozzles. Adjustment of the pulse width makes it possible to subtly adjust the dropping speed and volume of discharged ink. Thus, it is possible to stabilize the dripping speed and volume of discharged ink more when the number of discharge nozzles is changed.

The drive controller 22 causes the drive waveform amplifier circuit 24 to output the drive signal including the sub pulse signal Pc for shaking the ink liquid surface in the nozzle N, the pulse signal P applied after the sub pulse signal Pc. This makes it possible to adjust the dropping speed and volume of ink according to the relationship between the phase of the shaking of the liquid surface according to the sub pulse signal Pc and the phase of the pressure change by the pulse signal O. Thus, it is possible to stabilize the dropping speed and volume of discharged ink more when the number of discharge nozzles is changed.

The drive controller 22 adjusts the waveform of the drive signal such that at least one of the rise time T1 and the fall time T2 of the pulse signal P is longer as the number of discharge nozzles is smaller. As the number of discharge nozzles is smaller, that is, as the drive load of the capacitance of the piezoelectric element 127 is smaller overshoot and undershoot due to an effect of the inductance of the wiring cable 30 tend to increase. Thus, it is possible to suppress overshoot and undershoot to stabilize the dropping speed and volume of discharged ink by adjusting at least one of the rise time T1 and the fall time T2 as described above.

The drive controller 22 causes the drive waveform amplifier circuit 24 to output the drive signal including multiple pulse signals P, and the piezoelectric element 127 causes ink droplets that forms one pixel on the recording medium M to be discharged from the nozzle N. This makes it possible to record an image in the multi-drop method in which the density of a pixel can be adjusted by the number of ink droplets. As it is also possible to stabilize the dropping speed and volume of ink by adjusting the resistance value R of the resistance element 25, it is possible to join multiple ink droplets appropriately to land them at a desired position on the recording medium M.

In the method for adjusting the ink discharge head 10 in this embodiment in which the magnitude of the resistance value R of the resistance element 25 corresponds to the wiring length L of the wiring cable 30, it is possible to suppress a variation in the dropping speed and volume of ink caused by the inductance of the wiring cable 30 and effectively suppress deterioration of the image quality.

In the method for controlling the ink discharge head 10 according to Modification Example 2 of the present invention, the resistance value R and the resistance element 25 is adjusted every time a drive signal is applied so that the magnitude of the resistance value R of the resistance element 25 corresponds to the wiring length L of the wiring cable 30 and the number of the nozzles N through which ink is discharged according to the number of discharge nozzles. This makes it possible to suppress a variation of the dropping speed and volume of ink according to the number of discharge nozzles by adjustment of the resistance value R of the resistance element 25. Thus, it is possible to suppress deterioration of the image quality more effectively.

The present invention is not limited to the above-described embodiment, and a variety of changes can be made.

For example, in the above-described embodiment, the wiring cable 30 is an example of the wire, but the wiring cable 30 is not limited to this, and may be any other wiring such as an FPC.

At least part of the functions of the drive controller 22 may be realized by the controller 40. In that case, the drive controller 22 and the controller 40 constitute the drive controlling means and the resistance value controlling means.

"The number of the piezoelectric elements 127 which share the period of application of the drive signal" in the above-described embodiment is not necessarily the number of the piezoelectric elements 127 which share the start timing of application of the drive signal, and may be the number of the piezoelectric elements 127 which share the period of application of the drive signal at least partially. That is, "the number of the nozzles N through which ink is discharged at the same timing (the number of discharge nozzles)" is not limited to the number of the nozzles N through which ink is discharged simultaneously, but may be the number of the nozzles N corresponding to the piezoelectric elements 127 which share the period of application of the drive signal at least partially.

In the above-described embodiment, a multi-drop method is described in which multiple droplets are discharged to form one pixel as an example, but the present invention is not limited to this, and the present invention may be applied to an inkjet recording device in which a single droplet is discharged to form one pixel.

Adjustment of the drive signals according to the number of discharge nozzles may be omitted in a case where adjustment of the resistance value R of the resistance element 25 can suppress a variation of the dropping speed and volume of ink sufficiently.

In the above-described embodiment, a shear-mode ink discharge head 10 is described as an example, but the present invention is not limited to this example. For example, the present invention may be applied to a vent-mode ink discharge head which ink is discharged by pressure change in ink in the pressure chambers by deformation of the piezoelectric elements (pressure generating means) fixed on the wall surfaces of the pressure chambers.

In addition to this, any other pressure generating means that can cause pressure change in ink in the pressure chambers by exchanging heat and electromagnetism into space deformation may be used.

In the above-described embodiment, an example in which the recording medium M is conveyed by the conveyance belt 101 is described, but instead of this, the recording medium M may be held on the outer peripheral surface of the rotating conveying drum and conveyed.

The above-described embodiment illustrates the single-path inkjet recording device 1 as an example. However, the present invention may be applied to an inkjet recording device that records an image by scanning the ink discharge head 10.

While the present invention is described with some embodiments, the scope of the present invention is not limited to the above-described embodiment but encompasses the scope of the invention recited in the claims and the equivalent thereof.

INDUSTRIAL APPLICABILITY

The present invention can be used in an inkjet recording device, a method for adjusting an inkjet recording device, and a method for controlling an inkjet recording method.

REFERENCE SIGNS LIST

- 1 Inkjet Recording Device
- 10 Ink Discharge Head
- 11 Case
- 12 Head Chip
- 13 Head Substrate
- 14 Second Connector
- 15 Discharge Selection Switching Element
- 16 Third Connector
- 17 FPC
- 20 Driver
- 21 Drive Substrate
- 22 Drive Controller (Drive Controlling Means, Resistance Value Controlling Means)
- 23 DAC
- 24 Drive Waveform Amplifier Circuit (Drive Circuit)
- 25 Resistance Element
- 26 First Connector
- 27 Switching Element

30 Wiring Cable (Wire)
40 Controller
54 Temperature Detector
101 Conveyance Belt
102 Conveying Roller
103 Head Unit
121 Channel Substrate
122 Cover Plate
123 Nozzle Plate
127 Piezoelectric Element (Pressure Generating Means)
1271 Partition Wall
1272 Electrode
128 Pressure Chamber
M Recording Medium
N Nozzle
P, Pa, Pb Pulse Signals
Pc Sub Pulse Signal
R Resistance Value

What is claimed is:

1. An inkjet recording device comprising:
an inkjet discharge head including a nozzle through which ink is discharged, a pressure chamber that communicates to the nozzle, and a pressure generator that generates a pressure change in ink in the pressure chamber according to application of a drive signal to cause ink to be discharged from the nozzle;
a driver that is disposed outside the ink discharge head and that is provided with a drive circuit that outputs the drive signal; and
a wire that electrically connects the driver with the ink discharge head and through which the drive signal output from the drive circuit and applied to the pressure generator,
wherein the driver includes a resistance element provided in a transmission path of the drive signal between the drive circuit and the wire,
wherein a magnitude of a resistance value of the resistance element corresponds to a length of the wire,
wherein the resistance element is provided in a state in which the resistance value is changeable,
wherein the inkjet recording device further comprises:
a resistance value controller that changes the resistance value of the resistance element; and
a temperature detector that detects a temperature corresponding to the temperature in the ink discharge head, and
wherein the resistance value controller adjusts the resistance value of the resistance element based on the temperature detected by the temperature detector.

2. The inkjet recording device according to claim 1,
wherein the nozzle includes multiple nozzles,
wherein the pressure chamber includes multiple pressure chambers corresponding to the multiple nozzles,
wherein the pressure generator includes multiple pressure generators corresponding to the nozzles,
wherein the resistance value controller adjusts the resistance value of the resistance element at each time of application of the drive signal such that the resistance value of the resistance element corresponds to a number of nozzles through which ink is discharged at a same timing among the nozzles.

3. The inkjet recording device according to claim 1,
wherein the nozzle includes multiple nozzles,
wherein the pressure chamber includes multiple pressure chambers corresponding to the multiple nozzles,
wherein the pressure generator includes multiple pressure generators corresponding to the nozzles,
wherein with C defined as a capacitance of a capacitance load of the multiple pressure generators and with R as the resistance value of the resistance element, the resistance value of the resistance element is set in a range where a relationship of $CR<500$ ns is satisfied.

4. The inkjet recording device according to claim 1,
wherein the nozzle includes multiple nozzles,
wherein the pressure chamber includes multiple pressure chambers corresponding to the multiple nozzles,
wherein the pressure generator includes multiple pressure generators corresponding to the nozzles,
wherein the resistance value of the resistance element is set such that a change amount of a dropping speed of ink in response to a change in a number of nozzles through which ink is discharged at a same timing among the multiple nozzles satisfies a predetermined change amount suppressing condition.

5. The inkjet recording device according to claim 1,
wherein the ink discharge head includes multiple ink discharge heads;
wherein the driver includes multiple drivers corresponding to the multiple ink discharge heads; and
wherein the wire includes multiple wires corresponding to the multiple ink discharge heads;
wherein a magnitude of the resistance value of the resistance element included in each of the drivers corresponds to a length of the wire connected to the driver.

6. The inkjet recording device according to claim 1, further comprising:
a drive controller that controls an output operation of the drive signal by the drive circuit,
wherein the nozzle includes multiple nozzles,
wherein the pressure chamber includes multiple pressure chambers corresponding to the multiple nozzles,
wherein the pressure generator includes multiple pressure generators corresponding to the nozzles,
wherein the drive signal includes a pulse signal,
wherein the drive controller adjusts a voltage amplitude of the pulse signal according to a number of nozzles through which ink is discharged at a same timing among the multiple nozzles.

7. The inkjet recording device according to claim 6,
wherein the drive controller adjusts a pulse width of the pulse signal according to the number of the nozzles through which ink is discharged at the same timing.

8. The inkjet recording device according to claim 6,
wherein the drive controller causes the drive circuit to output a sub pulse signal for shaking a liquid surface of ink in the nozzle and the drive signal including the pulse signal applied sequentially after the sub pulse signal.

9. The inkjet recording device according to claim 6,
wherein the drive controller adjusts a waveform of the drive signal such that at least one of a rise time and a fall time of the pulse signal is longer for a smaller number of the nozzles through which ink is discharged at the same timing.

10. The inkjet recording device according to claim 6,
wherein the pulse signal includes multiple pulse signals,
wherein the drive controller causes the drive circuit to output the drive signal including the multiple pulse signals,
wherein the pressure generator causes multiple ink droplets that forms a pixel on a recording medium to be discharged from the nozzle according to the multiple pulse signals.

11. A method for adjusting an inkjet recording device, the inkjet recording device including an inkjet discharge head including a nozzle through which ink is discharged, a pressure chamber that communicates to the nozzle, and a pressure generator that generates a pressure change in ink in the pressure chamber according to application of a drive signal to cause ink to be discharged from the nozzle; a driver that is disposed outside the ink discharge head and that is provided with a drive circuit that outputs the drive signal; and a wire that electrically connects the driver with the ink discharge head and through which the drive signal output from the drive circuit and applied to the pressure generator, wherein the driver includes a resistance element provided in a transmission path of the drive signal between the drive circuit and the wire, wherein a magnitude of a resistance value of the resistance element is set to a value corresponding to a length of the wire, wherein the resistance element is provided in a state in which the resistance value is changeable, wherein the inkjet recording device further comprises:

a resistance value controller that changes the resistance value of the resistance element; and a temperature detector that detects a temperature corresponding to the temperature in the ink discharge head, and wherein the resistance value controller adjusts the resistance value of the resistance element based on the temperature detected by the temperature detector.

12. A method for controlling an inkjet recording device, the inkjet recording device including an inkjet discharge head including a nozzle through which ink is discharged, a pressure chamber that communicates to the nozzle, and a pressure generator that generates a pressure change in ink in the pressure chamber according to application of a drive signal to cause ink to be discharged from the nozzle; a driver that is disposed outside the ink discharge head and that is provided with a drive circuit that outputs the drive signal; and a wire that electrically connects the driver with the ink discharge head and through which the drive signal output from the drive circuit and applied to the pressure generator, wherein the driver includes a resistance element provided in a transmission path of the drive signal between the drive circuit and the wire, wherein the nozzle includes multiple nozzles, wherein the pressure chamber includes multiple pressure chambers corresponding to the multiple nozzles, and wherein the pressure generator includes multiple pressure generators corresponding to the nozzles, wherein at each time of application of the drive signal, a resistance value of the resistance element is adjusted such that a magnitude of the resistance value of the resistance element corresponds to a length of the wire and to a number of nozzles through which ink is discharged at a same timing among nozzles, wherein the resistance element is provided in a state in which the resistance value is changeable, wherein the inkjet recording device further comprises:

a resistance value controller that changes the resistance value of the resistance element; and a temperature detector that detects a temperature corresponding to the temperature in the ink discharge head, and wherein the resistance value controller adjusts the resistance value of the resistance element based on the temperature detected by the temperature detector.

* * * * *